Patented Feb. 27, 1923.

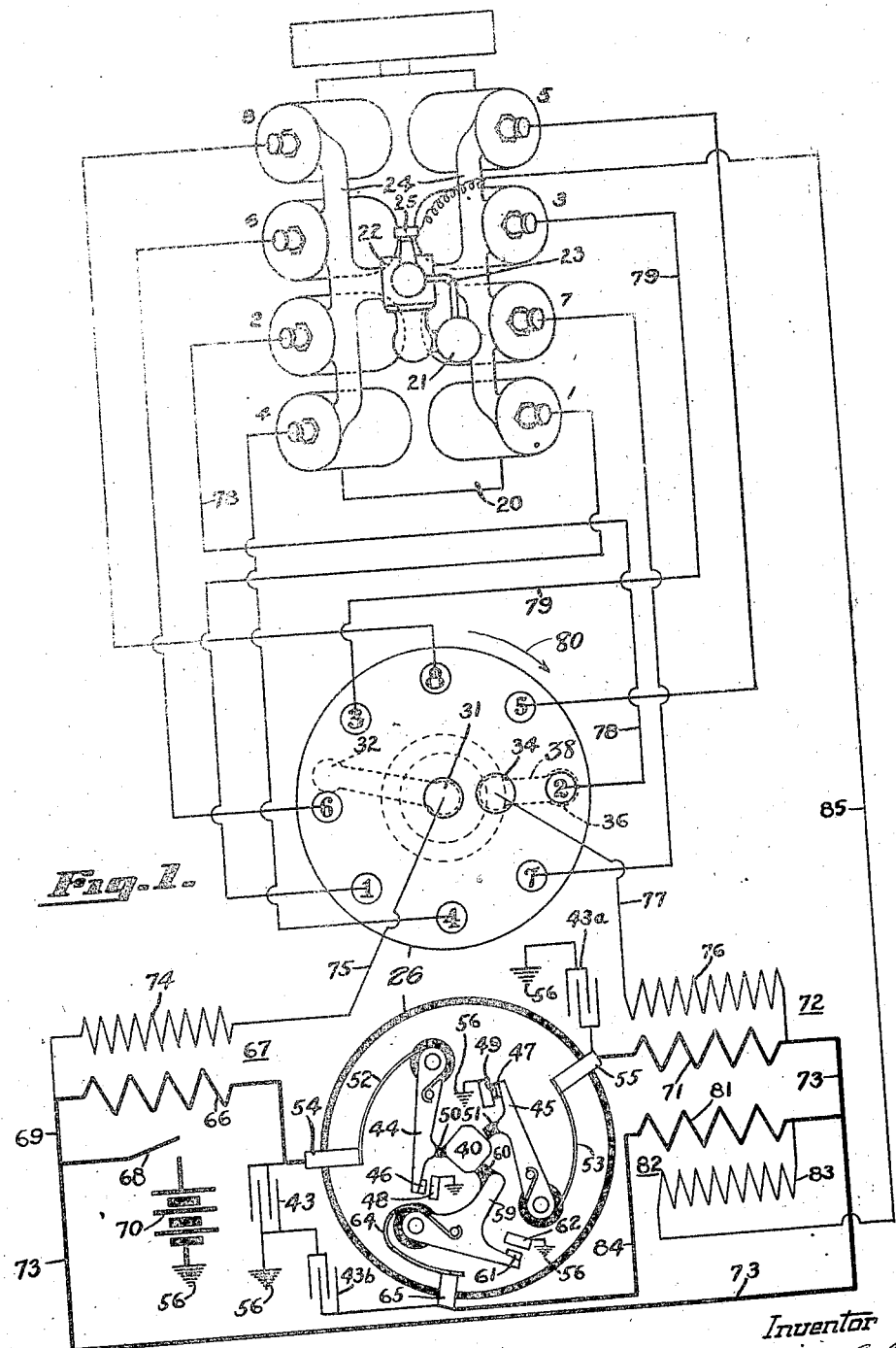

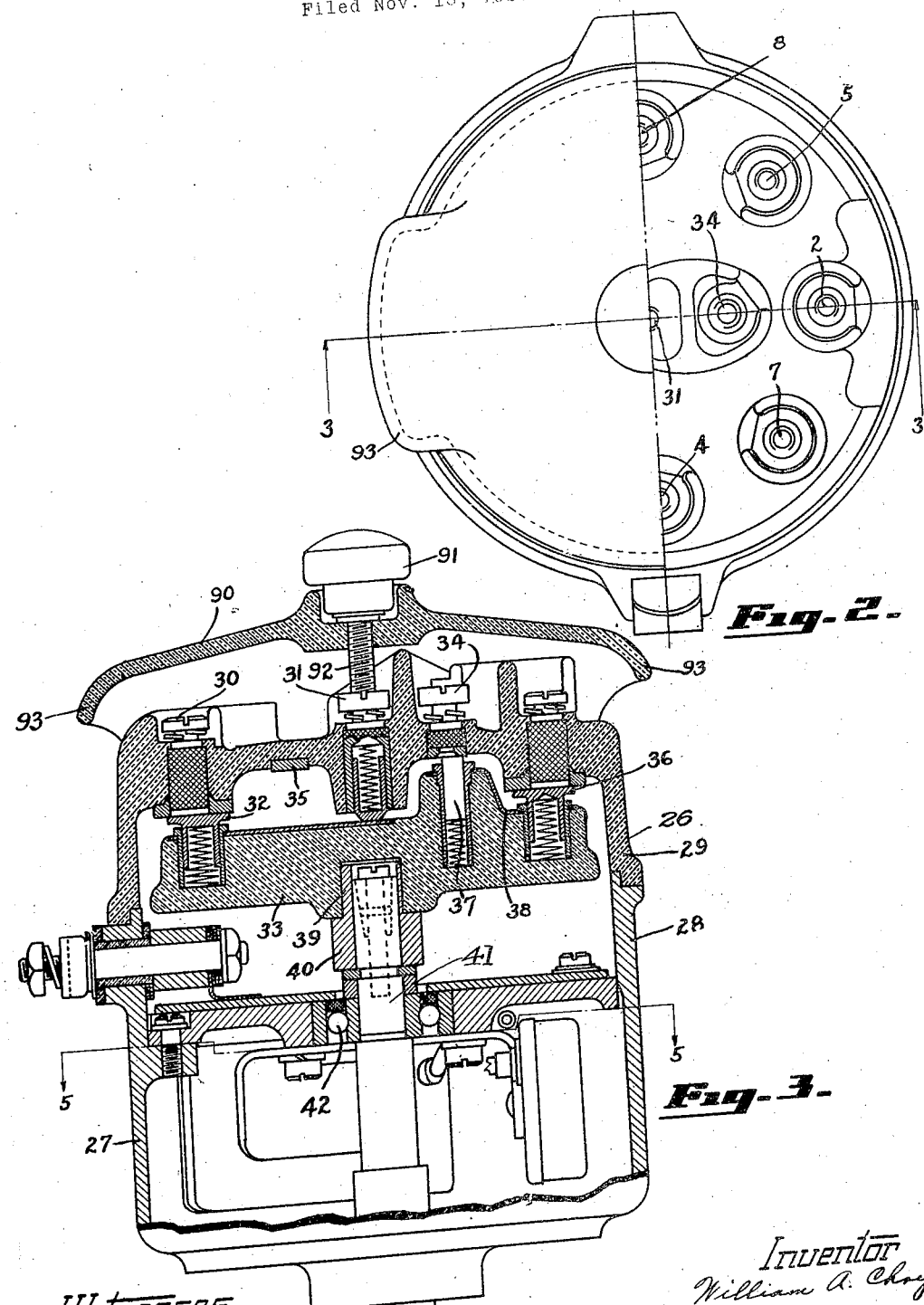

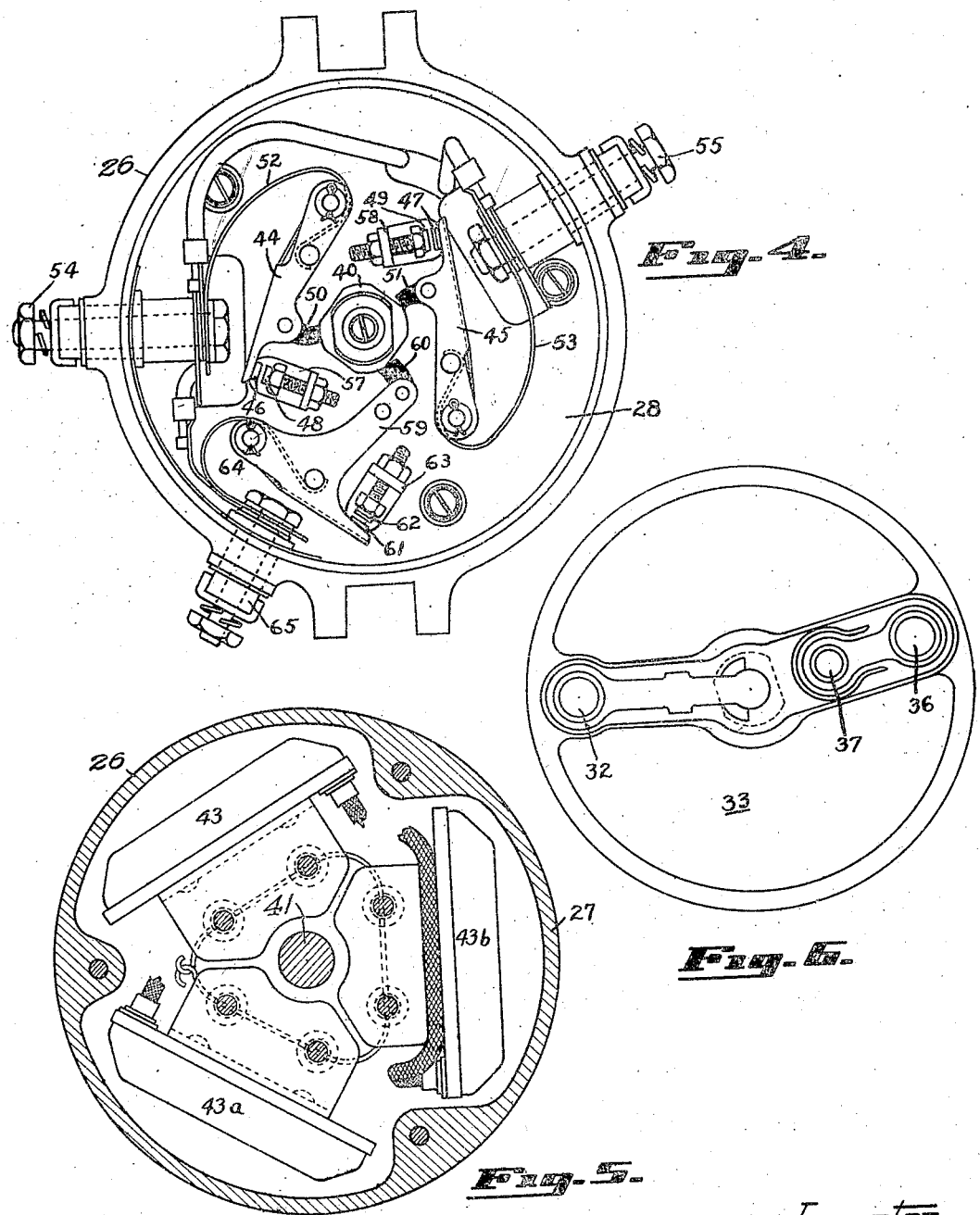

1,446,962

UNITED STATES PATENT OFFICE.

WILLIAM A. CHRYST, OF DAYTON, OHIO, ASSIGNOR TO THE DAYTON ENGINEERING LABORATORIES COMPANY, OF DAYTON, OHIO, A CORPORATION OF OHIO.

IGNITION SYSTEM.

Application filed November 18, 1920. Serial No. 424,835.

*To all whom it may concern:*

Be it known that I, WILLIAM A. CHRYST, a citizen of the United States of America, residing at Dayton, county of Montgomery, and State of Ohio, have invented certain new and useful Improvements in Ignition Systems, of which the following is a full, clear, and exact description.

This invention relates to ignition systems for providing ignition for an internal-combustion engine and a fuel burner associated with said engine for heating the intake manifold thereof.

It is among the objects of the present invention to provide an ignition system whereby sparking impulses of greater intensity will be furnished to the engine than to the burner.

A further object is to provide a unitary structure including timing devices so arranged as to accomplish the foregoing objects of the invention.

A further object is to provide ignition for an engine having non-symmetrical firing order and for an engine heating burner connected thereto.

Further objects of the present invention will be apparent from the following description, reference being had to the accompanying drawings, wherein preferred embodiments of the present invention are clearly shown.

In the drawings:

Fig. 1 is a diagrammatic plan view of an engine and circuit diagram of an ignition system embodying the invention.

Fig. 2 is a top plan view of the ignition unit, the right hand of the cover plate being shown cut away to clearly illustrate the distributor terminals.

Fig. 3 is a sectional view taken along the line 3—3 of Fig. 2.

Fig. 4 is a top plan view of the ignition unit with the distributor and rotor elements removed.

Fig. 5 is a sectional view taken along the line 5—5 of Fig. 3.

Fig. 6 is a plan view of the rotor element of the distributor.

Referring to the drawings, the internal-combustion engine 20 shown in Fig. 1 includes two rows of cylinders arranged in converging relation, the firing order being shown by numbers 1 to 8. The carburetor 21 is connected to the fuel burner 22 by means of a fuel passage 23. Both carburetor 21 and burner 22 are connected to the intake passage 24 of engine 20.

The burner 22 may be of any suitable structure, such as is described and illustrated in the copending application of William A. Chryst, Serial No. 367,630 filed March 22, 1920, being provided with a spark plug 25 which is connected to the burner ignition apparatus to be described.

26 designates as a whole an ignition unit including apparatus for both engines and burner ignition. The unit 26 may be supported by the engine 20 in any suitable manner, and comprises a housing 27 for enclosing the driving mechanism and certain elements of the ignition system. The housing 27 terminates at its upper end in a timer cup 28 upon which is supported a distributor head 29 made of any suitable insulating material and which includes a series of terminals 30 marked 1, 4, 7, 2, 5, 8, 3, 6, electrically connected to correspondingly marked cylinders of engine 20 for transmitting the sparking impulses to the engine as will be described hereinafter.

The distributor head 29 is provided with a central terminal 31 which cooperates with one contact button 32 of the rotor 33 (see Fig. 6) to distribute sparking impulses to the engine. The other terminal 34 of the head 29 is connected with circular track 35, embedded in the inner face of the distributor head, said track in turn being in electrical connection with button 36 by means of rubbing brush 37 and metal strip 38. These two rotor buttons 32 and 36 are adapted to direct the sparking impulses to the engine cylinders in alternate recurrent sequence. The rotor 33 is mounted upon a shouldered shank portion 39 of the timer cam 40. This cam is carried by the shaft 41 journaled in the bearing 42 supported by housing 27. Just below this bearing 42 and supported by said housing are three condenser units 43, 43ª, 43ᵇ (shown in Fig. 5) adapted to cooperate with the interrupters described hereinafter.

The timer cam 40 carried by the shaft 41, cooperates with breaker levers 44 and 45 which are arranged with respect to the timer cam in such a manner as to be alternately operated.

As described and claimed in the copending application of John H. Hunt, Serial No.

261,945 filed Nov. 11, 1918, the angle between the lines joining the cam axis with the pivots of these levers 44 and 45 is equal to $180° - \frac{V}{2}$, where V is equal to the angle between the rows of cylinders, and where the number of cam lobes is equal to one-half the number of engine cylinders. In the particular engine shown by way of example in the drawings, the number of cylinders is eight, and V, the angle between the rows of cylinders, is 60 degrees. Therefore $\frac{V}{2} = 30$ degrees and the number of cam lobes equals four. This angle $180° - \frac{V}{2}$ will be referred to as the angle between levers 44 and 45, and, in the present example, this angle is 150 degrees.

These breaker levers are supported within the timer cup 28 and insulated therefrom in any suitable manner. Contact points 46 and 47 are carried by the levers 44 and 45 respectively and are adapted to cooperate with stationary contacts 48 and 49 respectively. The levers 44 and 45 are provided with rubbing blocks or riders 50 and 51 respectively, which are adapted to engage with the faces of cam 40 the operation of which tends to manipulate the levers 44 and 45 to open and close the contact points 46 and 48, and 47 and 49 in recurrent sequence. These rubbing blocks 50 and 51, or riders, are held in engagement with cam 40 by means of springs 52 and 53 connected to insulated terminal posts 54 and 55 respectively. The springs 52 and 53 are adapted to act as electrical conductors between the movable contact levers 44 and 45 and insulated terminal posts 54 and 55 respectively. These posts 54 and 55 are connected to one side of the condensers 43 and 43ª, the other side of said condensers being grounded as at 56.

Stationary contact points 48 and 49 are mounted upon brackets 57 and 58 respectively, these standards being grounded on the ignition unit frame.

A third interrupter device is provided, including a breaker lever 59 supported by but insulated from the timer cup 28 in any suitable manner. Said breaker lever 59 carries a rubbing block or rider 60, having a surface adapted to engage with the cam 40 whereby said lever may be operated by said cam. This rubbing block 60 is of greater width than the rubbing blocks 50 and 51 of levers 44 and 45 respectively, for purposes to be detailedly described hereinafter.

The lever 59 carries a contact point 61 adapted to cooperate with the stationary contact 62 supported by standard 63 in electrical engagement with the frame of the ignition unit 28. The spring 64 is adapted to hold the rubbing block 60 of lever 59 in engagement with the cam 40, said spring also acting as an electrical conductor between the lever 59 and terminal post 65. One end of condenser 43ᵇ is connected to the post 65 while the other end is grounded as at 56.

By referring to Fig. 1 it may be seen that the terminal post 54 is connected to one end of the primary winding 66 of ignition coil 67 while the other end of said primary winding is connected to a switch 68 by means of lead wire 69. The switch 68 in turn is adapted to connect said primary winding to the storage battery 70.

The terminal post 55 is connected to one end of the primary winding 71 of coil 72 while the other end of said winding is connected to the switch 68 by means of lead wire 73.

Ignition coil 67 is provided with a secondary winding 74 in electrical connection with the rotor button 32 by means of lead wire 75 and terminal 31 while secondary winding 76 of coil 72 is connected to rotor button 36 by lead wire 77 and terminal 34. These rotor buttons 32 and 36 are so arranged as to distribute the sparking impulses of their respective ignition coils to the various cylinders of the engine 20 in alternate recurrent sequence. As described and claimed in the copending application of John H. Hunt referred to, the angle between the lines joining the rotor axis with the axes of these buttons is equal to $180° -$ $$\left(\frac{360°}{N} - \frac{V}{2}\right),$$

where N equals the number of cylinders and V equals the angle between the rows of cylinders. The angle between these buttons 32 and 36 therefore equals $180° -$ $$\left(\frac{360°}{8} - \frac{60°}{2}\right)$$

equals $180° - 15° = 165°$. With the breaker levers and distributor buttons arranged in this manner, ignition for an eight cylinder engine of the 60 degree V type will be provided. Such an engine has asymmetrically arranged firing intervals of 60 degrees, 120 degrees, alternately, referring to crank shaft rotation. As has been mentioned heretofore the cam 40 is adapted to operate the breaker levers of the interrupters carried by the timer cup 28, to provide sparking impulses to the engine and fuel burner. Referring to Fig. 1, the contacts 47 and 49 are shown in engagement, thereby permitting current to flow from the battery 70 across switch 68, lead wire 73, primary winding 71, terminal post 55, spring conductor 53, lever arm 45, across contacts 47 and 49 and back to the battery via ground connections 56. As soon as the cam 40 rotates enough to break the engagement of the said contacts a current will be induced in the secondary winding 76 of coil 72, said current flowing through lead wire 77, to terminal 34, connector strip 38 (see Fig. 3) to button 36 whence as shown in Fig. 1 it will be directed through the terminal marked 2 through wire 78 to the correspondingly marked cylinder 2, thereby providing a sparking impulse to this cylinder. Further operation of the cam 40 will permit contacts 46 and 48 to close causing current to flow from the battery 70, switch 68, lead wire 69, primary winding 66 of ignition coil 67, terminal post 54, spring conductor 52, lever arm 44, contacts 46 and 48 and back to the battery via ground connections 56. The interruption of this circuit by the breaking of engagement of contacts 46 and 48 will cause an induced current to flow from the secondary coil 74, lead 75 to terminal 31 button 32 to terminal marked 3 and thence to the correspondingly marked cylinder via lead wire 79. The rotation of the rotor is in the direction of the arrow 80.

Contacts 61 and 62 are also controlled by the cam 40. When these contacts are in engagement current will flow from the battery 20, across switch 68, through lead wire 73, primary winding 81 of ignition coil 82, lead wire 84, to terminal post 65, spring conductor 64, breaker lever 59 across contacts 61 and 62 back to the battery via ground connections 56. The breaking of the circuit at the contacts 61 and 62 will tend to induce a current in secondary winding 83 of coil 82, from whence this induced current will be directed through wire 85 to the spark plug 25 of the fuel burner 22.

It has been found by experiment that a spark of lesser intensity is required to efficiently operate the burner than the spark required to operate the engine. It is for that purpose that the rubbing block 60 of the breaker lever 59 of the fuel burner interrupter is provided with a broader cam contacting face than those rubbing blocks 50 and 51 of the engine ignition interrupters. It will be seen that the time of dwell of the burner interrupter rubbing block on the cam lobes is of greater length than that of the engine interrupter rubbing blocks thereby causing the primary winding 81, of the burner ignition coil 82, to be connected to the battery for a lesser period than the primary windings 66 or 71 of the engine ignition coils 67 or 72 respectively. This will result in a lesser building up of the burner ignition coil than the engine ignition coils and consequently reduce current consumption while still maintaining efficient operation of the various elements of the ignition system.

The cover 90 is adapted to fit over the ignition unit 26, being held in position by means of a thumb nut 91 screwed onto a stud 92, secured to the ignition unit and adapted to project through a central opening in the cover. Two oppositely disposed channels or openings 93 are provided in the cover and act as conduits for the various wires that lead from the terminals marked 1, 6, 3, 8, 5, 2, 7, 4, to their respective cylinders.

While the forms of mechanisms herein shown and described constitute preferred forms of embodiments of the invention, it is to be understood that other forms might be adopted, all coming within the scope of the claims which follow.

What I claim is as follows:

1. In an ignition system the combination with an engine provided with a fuel burner for heating the intake thereof; of an induction device for supplying engine ignition and burner ignition; and means for controlling said ignition device whereby the burner ignition impulse will be less in intensity than the engine ignition impulses.

2. In an ignition system, the combination with an engine provided with a fuel burner for heating the intake thereof; of induction means for supplying engine ignition; induction means for supplying burner ignition; and means for controlling said induction means whereby the burner ignition induction means will be charged with magneto motive force to a lesser degree than the engine ignition induction means.

3. In an ignition system, the combination with an engine provided with a fuel burner for heating the intake manifold thereof; of a source of current supply; apparatus, including induction means and timing devices for producing sparking impulses for engine ignition and for burner ignition, said engine ignition timing device permitting a current flow of longer duration than the burner ignition timing device, whereby the engine ignition impulse will be of greater intensity than the burner ignition impulse; and means for distributing the engine and burner ignition impulses to their respective sparking devices.

4. In an ignition system, the combination with an engine provided with a fuel burner for heating the intake manifold thereof; of a source of current supply; apparatus, including separate induction means and timing devices for providing sparking impulses for the engine ignition and burner ignition, said engine ignition timing device permitting a current flow of longer duration than the burner ignition timing device, whereby the engine ignition impulse will be of greater intensity than the burner ignition impulse; and means for distributing the engine and burner ignition impulses to their respective sparking devices.

5. In an ignition system, the combination with a multi-cylinder engine provided with a fuel burner for heating the intake manifold thereof; of a source of current supply; apparatus, including separate induction means and timing devices, for providing sparking impulses for the engine ignition and burner ignition, said engine ignition timing device permitting a current flow of longer duration than the burner ignition timing device, whereby the engine ignition impulse will be of greater intensity than the burner ignition impulse; and a common engine operated distributor, for directing the engine and burner ignition impulses to their respective sparking devices.

6. In an ignition system, the combination with an engine provided with a fuel burner for heating the intake manifold thereof; of a source of current supply; ignition apparatus including induction means and an ignition unit having circuit interrupters, located in the same plane, for both engine and burner ignition; a common cam for operating said interrupters; and cam riders associated with both the engine and burner ignition interrupters, the rider of the burner interrupter having a wider cam riding surface than the engine interrupter whereby said burner interrupter will be held open for a longer period than the engine interrupter to reduce the intensity of the sparking impulses of the burner ignition relative to the engine ignition.

7. In an ignition system, the combination with a multi-cylinder engine having non-symmetrical firing order and provided with a fuel burner for heating the intake manifold; of a source of current supply; ignition apparatus including induction devices and circuit interrupters for providing sparking impulses in non-symmetrical order for the engine and sparking impulses for the burner; means for operating said interrupters; means associated with said interrupters whereby the engine ignition interrupters will be maintained in circuit closing position for a longer time interval than the burner ignition interrupters for providing the engine ignition with a spark of greater intensity than the burner ignition; and means for distributing these sparking impulses to their respective sparking devices.

8. In an ignition system, the combination with a multi-cylinder engine having non-symmetrical firing order and provided with a fuel burner for heating the intake manifold; of a source of current supply; ignition apparatus including induction devices and circuit interrupters for providing sparking impulses in non-symmetrical firing order for the engine and sparking impulses for the burner; a common camming element for operating said interrupters; means associated with said interrupters whereby the engine ignition interrupters will be maintained in circuit closing position for a longer time interval than the burner ignition interrupters for providing the engine ignition with a spark of greater intensity than the burner ignition; and means for distributing these sparking impulses to their respective sparking devices.

In testimony whereof I hereto affix my signature.

WILLIAM A. CHRYST.

Witnesses:
C. DALE MILLER,
H. E. SOLLENBERGER.